United States Patent
Li et al.

(10) Patent No.: US 6,690,501 B2
(45) Date of Patent: Feb. 10, 2004

(54) LOW COST ISOLATOR/POLARIZATION BEAM COMBINER HYBRID COMPONENT

(75) Inventors: Yiqiang Li, San Jose, CA (US); Yongjian Wang, Saratoga, CA (US)

(73) Assignee: AC Photonics, Inc., Santa Clara, CA (US)

( * ) Notice: Subject to any disclaimer, the term of this patent is extended or adjusted under 35 U.S.C. 154(b) by 43 days.

(21) Appl. No.: 10/039,027

(22) Filed: Jan. 3, 2002

(65) Prior Publication Data

US 2003/0072069 A1 Apr. 17, 2003

Related U.S. Application Data

(60) Provisional application No. 60/329,605, filed on Oct. 15, 2001.

(51) Int. Cl.[7] .......................... G02F 1/03; G02B 27/30; G02B 5/04; G02B 5/30; G02B 6/00
(52) U.S. Cl. .............. 359/251; 359/641; 359/615; 359/494; 359/495; 385/11
(58) Field of Search .......................... 359/280, 494, 359/495, 251, 256, 615, 641, 831, 837, 669; 385/45, 11, 140

(56) References Cited

U.S. PATENT DOCUMENTS

2002/0191881 A1 * 12/2002 Chen et al. ................. 385/11
2003/0049009 A1 * 3/2003 Vaganov et al. ............ 385/140

* cited by examiner

*Primary Examiner*—Georgia Epps
*Assistant Examiner*—Jack Dinh
(74) *Attorney, Agent, or Firm*—Sawyer Law Group LLP

(57) ABSTRACT

A method and system for providing an isolator/polarization beam deflector is disclosed. The method and system include a first collimator, a core and a second collimator. The first collimator collimates a plurality of optical signals traveling in a first direction. The core receives the optical signals from the first collimator. The core includes first and second birefringent wedges and a rotator between the first and second birefringent wedges. The first collimator, the first birefringent wedge and the rotator transmit the optical signals such that the optical signals cross at an interface between the rotator and the second birefringent wedge. The core transmits the optical signals with a deflection, combines the optical signals to provide a combined optical signal and prevents a reflected portion of the optical signals from traveling opposite to the first direction. The second collimator receives and couples the combined optical signal to the output.

8 Claims, 8 Drawing Sheets

LOW COST ISOLATOR/POLARIZATION BEAM COMBINER HYBRID COMPONENT

CROSS-REFERENCE TO RELATED APPLICATION

This application is claiming under 35 U.S.C. §119(e) the benefit of provisional patent application Ser. No. 60/329,605, filed Oct. 15, 2001.

FIELD OF THE INVENTION

The present invention relates to optical systems, and more particularly to a method and system for providing an isolator/polarization beam combiner.

BACKGROUND OF THE INVENTION

In fiber optic communication, the optical signal propagates inside an optical fiber. Due to the nature of optical fibers, optical signal attenuation always exists. To overcome this signal attenuation in long distance communication systems, optical signal amplification using an optical amplifier is required. Both Erbium Doped Fiber Amplifier (EDFA) or Raman Amplifier can be utilized as the optical amplifier. In order for the optical signal to propagate a longer distance, an optical amplifier with high output power is preferred.

Pump lasers with high output power are used in order to achieve high output power in high power optical amplifiers. In current technology, the output power of a single pump laser is limited. Higher pump power can be achieved by combining two pump signals having orthogonal polarization states. Furthermore, an optical isolator is required to prevent any back reflected signal from getting back to the pump so that a stabilized combined pump power can be achieved.

FIG. 1 depicts a conventional isolator/polarization beam combiner 10. The conventional isolator/polarization beam combiner includes a dual fiber collimator 16, a Wollaston prism 22, a polarization beam displacer 24, an isolator core 26 and a single fiber collimator 28. The collimators 16 and 28 include pigtails 18 and 32, respectively, lenses 20 and 30, respectively. The lenses 20 and 30 are both GRIN lenses. Furthermore, the optical signals input from the fibers 12 and 14 cross at the face of the GRIN lens 20.

The conventional isolator/polarization beam combiner 10 accepts a first optical signal from fiber 12 and a second optical signal from the fiber 14. The polarizations of the optical signals are typically perpendicular. In addition, the fibers 12 and 14 are typically polarization maintaining (PM) fibers. The dual fiber collimator 16 collimates the optical signals such that the optical signals cross at the face of the GRIN lens 20. The optical signals are then deflected to travel horizontally by the Wollaston prism 22 and combined by the polarization beam displacer 24. The combined optical signal is transmitted by the isolator core 26, which also prevents back reflections from the single fiber collimator 28 from being provided back to the input fibers 12 and 14. The single fiber collimator 28 then focuses the combined signals and outputs this combined signal through the fiber 34.

Although the conventional isolator/polarization beam combiner 10 functions, one of ordinary skill in the art will readily recognize that there are several drawbacks to its operation. First, a large number of discrete components are used: the dual fiber collimator 16, the Wollaston prism 22, the polarization beam displacer 24, the isolator core 26 and the single fiber collimator 28. Because of the large number of components, a large insertion loss is introduced. Moreover, the large number of components makes assembly of the conventional isolator/polarization beam combiner 10 more difficult. In addition, the conventional isolator/polarization beam combiner 10 is expensive, due in part to the use of a large number of optical components and the expense of certain optical components. For example, the GRIN lenses 20 and 30 are expensive to purchase. Furthermore, the conventional isolator/polarization beam combiner 10 has a higher polarization dependent loss because of the separated ordinary and extraordinary beams introduced by the isolator core 26. Thus, the conventional isolator/polarization beam combiner 10 has relatively high losses and is expensive and difficult to assemble.

Accordingly, what is needed is a system and method for combining and isolating two signals with a lower insertion loss, lower PDL and a lower cost. The present invention addresses such a need.

SUMMARY OF THE INVENTION

The present invention provides a method and system for providing an isolator/polarization beam combiner. The method and system comprise providing a first collimator, a core and a second collimator. The first collimator collimates a plurality of optical signals traveling in a first direction. The core receives the plurality of optical signals from the first collimator. The core includes a first birefringent wedge, a second birefringent wedge and a rotator between the first and second birefringent wedges. The first collimator, the first birefringent wedge and the rotator transmit the plurality of optical signals such that the plurality of optical signals cross at an interface between the rotator and the second birefringent wedge. The core transmits the plurality of optical signals with a deflection, combines the plurality of optical signals to provide a combined optical signal and prevents a reflected portion of the plurality of optical signals from traveling opposite to the first direction. The second collimator receives and collimates the combined optical signal.

According to the system and method disclosed herein, the present invention provides a low cost isolator/polarization beam combiner.

DETAILED DESCRIPTION OF THE INVENTION

The present invention relates to an improvement in optical systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for providing an isolator/polarization beam combiner. The method and system comprise providing a first collimator, a core and a second collimator. The first collimator collimates a plurality of optical signals traveling in a first direction. The core receives the plurality of optical signals from the first collimator. The core includes a first birefringent wedge, a second birefringent wedge and a rotator between the first and second birefringent wedges. The first collimator, the first birefringent wedge and the rotator transmit the plurality of optical signals such that the plurality of optical signals cross at an interface between the rotator and the second birefringent wedge. The core transmits the plurality of optical signals with a deflection, combines the plurality of optical signals to provide a combined optical signal and prevents a reflected portion of the plurality of optical signals from traveling opposite to the first direction. The second collimator receives the combined optical signal.

For clarity, the present invention will be described in terms of signals traveling in a first direction and a second direction. However, one of ordinary skill in the art will readily recognize that the signals travel generally in the first and second directions, but are typically deflected to a certain extent. Thus, a signal described as traveling in the first direction need not always be exactly parallel to a first direction. Instead, some component of the direction of travel of the signal is in the first direction. Similarly, a signal described as traveling in the second direction need not always be exactly parallel to the second direction. Instead, some component of the direction of travel of the signal is in the second direction. Furthermore, the present invention is described in the context of particular components. However, one of ordinary skill in the art will readily recognize the system and method are consistent with other components having similar functions. Moreover, the present invention is described in the context of optical signals being provided to various components. However, one of ordinary skill in the art will readily recognize that there are some losses in the signals during operation.

Figure 1:
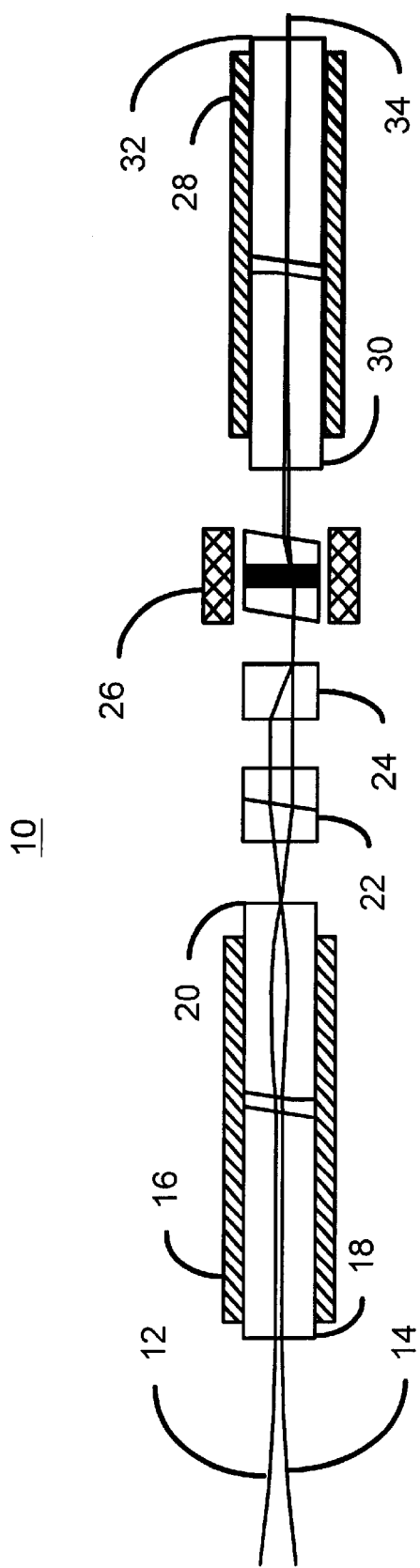
FIG. 1 is a diagram of a conventional isolator/polarization beam combiner.
Figure 2:
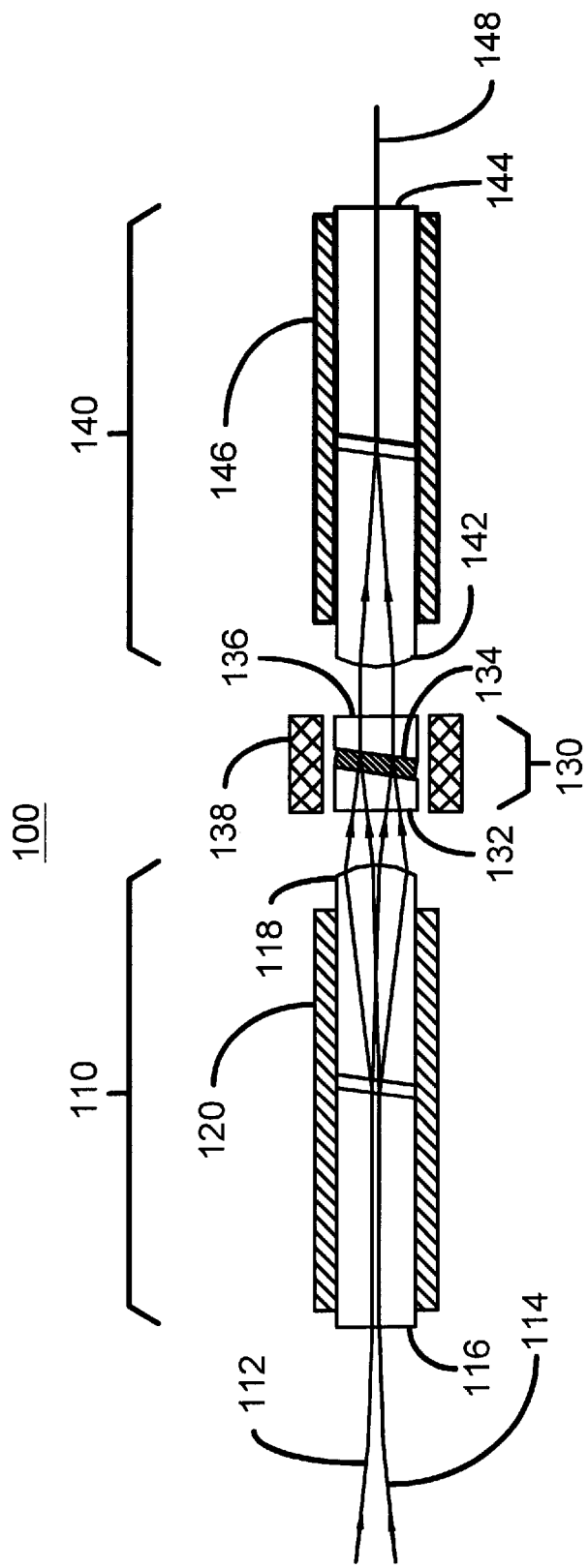
FIG. 2 is a diagram of one embodiment of an isolator/polarization beam combiner in accordance with the present invention.

To more particularly illustrate the method and system in accordance with the present invention, refer now to FIG. 2, depicting one embodiment of an isolator/polarization beam combiner 100 in accordance with the present invention. The isolator/polarization beam combiner 100 includes a first collimator 110, an isolator/polarization beam deflector 130, and a second collimator 140. The first collimator 110 and the second collimator 140 each preferably uses a C-lens (manufactured by Koncent Communication, Inc. of Fuzhou, P. R. China) or aspherical lens. The first collimator 110 is preferably a dual fiber collimator 110, while the second collimator 140 is preferably a single fiber collimator 140. The isolator/polarization beam deflector 130 transmits the optical signals traveling in a first direction (generally toward the right in FIG. 2) and prevents reflections of the optical signals, described below, from being transmitted in the second direction.

The isolator/polarization beam deflector 130 includes a first birefringent wedge 132, a rotator 134, a second birefringent wedge 136 and a magnetic ring 138. The rotator 134 rotates the polarization of optical signals by a particular amount, preferably 45 degrees, and is preferably a Faraday rotator. The birefringent wedges 132 and 136 have optical axes that are separated by 45 degrees.

Optical signals are input to the isolator/polarization beam combiner 100 using the fibers 112 and 114. The fibers 112 and 114 are preferably polarization maintaining (PM) fibers. The first collimator 110 collimates the optical signals and provides the optical signal to the isolator/polarization beam deflector 130. The dual fiber collimator 110 also provides the optical signals to the isolator/polarization beam deflector 130 at an angle. The combination of the first collimator 110, the first birefringent wedge 132 and the rotator 134 ensure that the optical signals cross at the interface between the rotator 134 and the second birefringent wedge 136. The optical signals that are transmitted by the isolator/polarization beam deflector 130 parallel and horizontal as shown in FIG. 2. The isolator/polarization beam combiner 100 also ensures that reflections traveling in a direction opposite to the optical signal are isolated from the input fibers 112 and 114. The optical signals are then received by the single fiber collimator 140 and output over the fiber 148.

Thus, the isolator/polarization beam combiner 100 can combine signals and provide isolation from reflections or other signals. Furthermore, the isolator/polarization beam combiner 100 uses a smaller number of components, resulting in fewer insertion losses. Finally, because of the use of fewer components and less expensive components, the isolator/polarization beam combiner 100 is cheaper and simpler to fabricate.

To more particularly describe the operation of the isolator/polarization beam combiner 100, preferred embodiments of the dual fiber collimator 110 and the isolator/polarization beam deflector 130 are separately described below.

Figure 3:
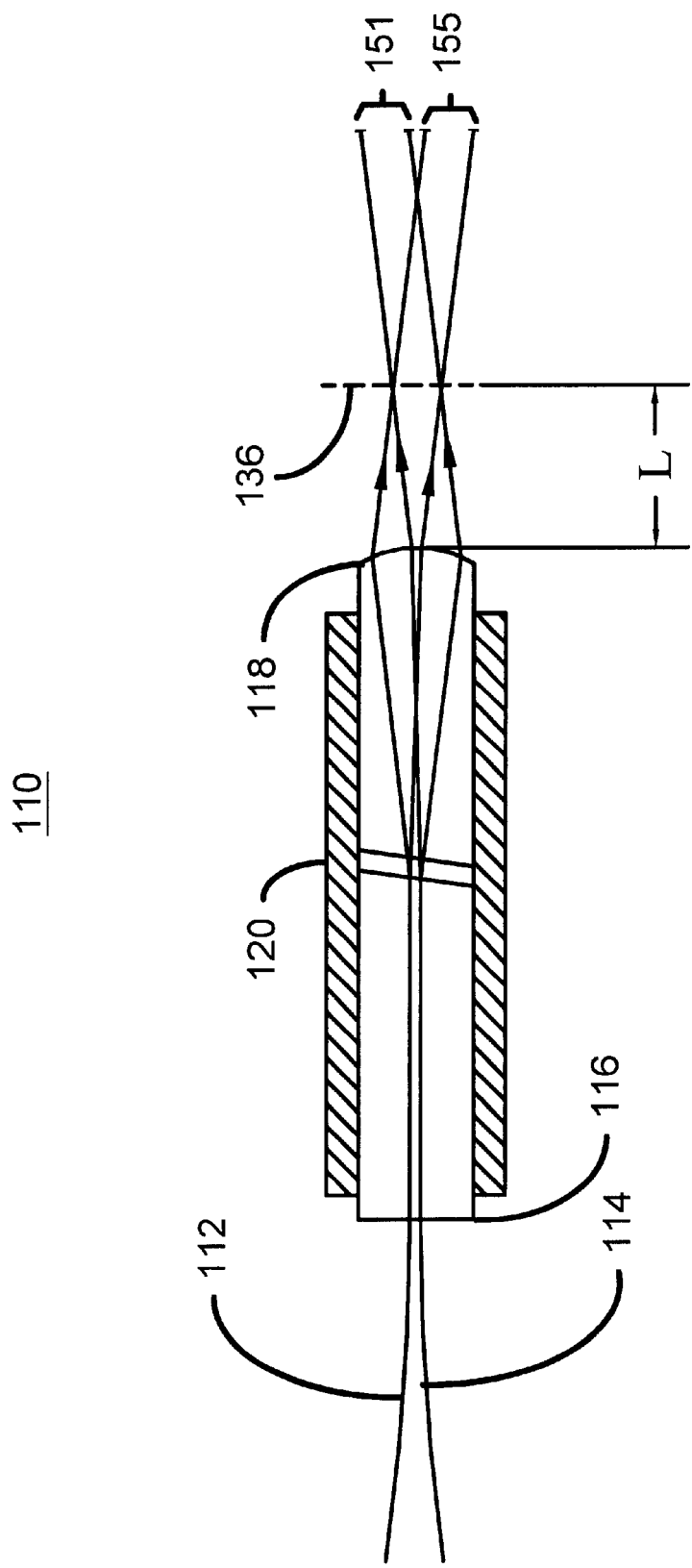
FIG. 3 is a side view of one embodiment of a dual fiber collimator in accordance with the present invention.

FIG. 3 is a side view of one embodiment of the first collimator 110 in accordance with the present invention. The first collimator 110 is preferably a dual fiber collimator 110. The dual fiber collimator 110 includes a pigtail 116, and a C lens or aspherical lens 118 held in a glass tube 120. The capillary 116 holds fibers 112 and 114. The fibers 112 and 114 are preferably PM fibers. The two beams 151 and 155 are collimated such that, in the absence of other components, the beam 151 would cross with the beam 155 at a distance L from the closest point on the front of the C-lens 118. The plane in which the beams 151 and 155 cross is defined as the cross plane 136. The distance L is defined as the crossing distance. The crossing distance is preferably 2~3 mm. In addition, the beams 151 and 155 are separated by an angle (not shown in FIG. 3), β, defined as the beam separation angle. The beam separation angle is preferably approximately 2~4 degrees.

Figure 4:
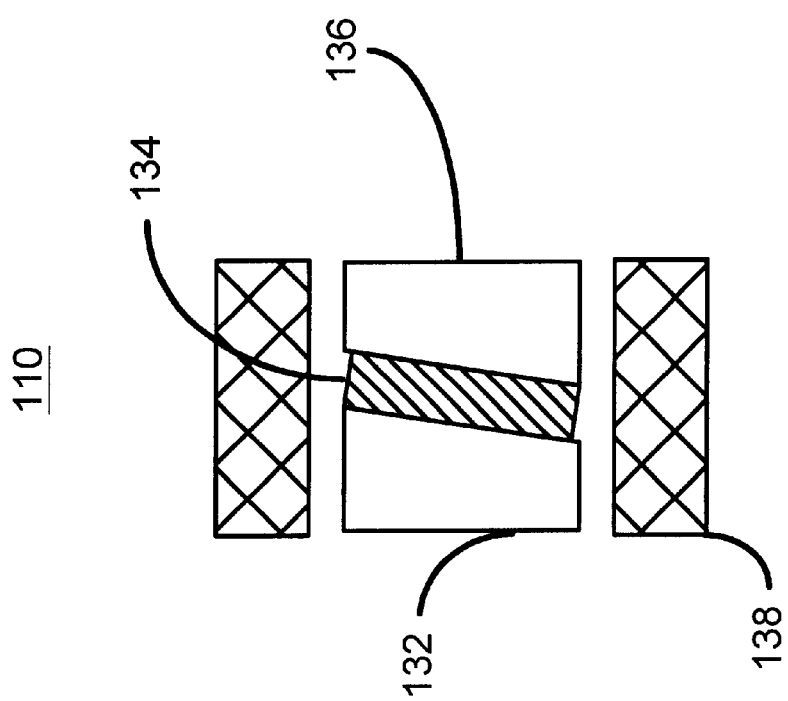
FIG. 4 is a side view of one embodiment of an isolator/polarization beam deflector in accordance with the present invention.

FIG. 4 is a side view of one embodiment of an isolator/polarization beam deflector 130 in accordance with the present invention. The isolator/polarization beam deflector 130 includes a first birefringent wedge 132, a rotator 134, a second birefringent wedge 136 and a magnetic ring 138. The birefringent wedges 132 and 136 are preferably made of $YVO_4$, Rutile, $LiNbO_3$ or calcite.

Figure 5:
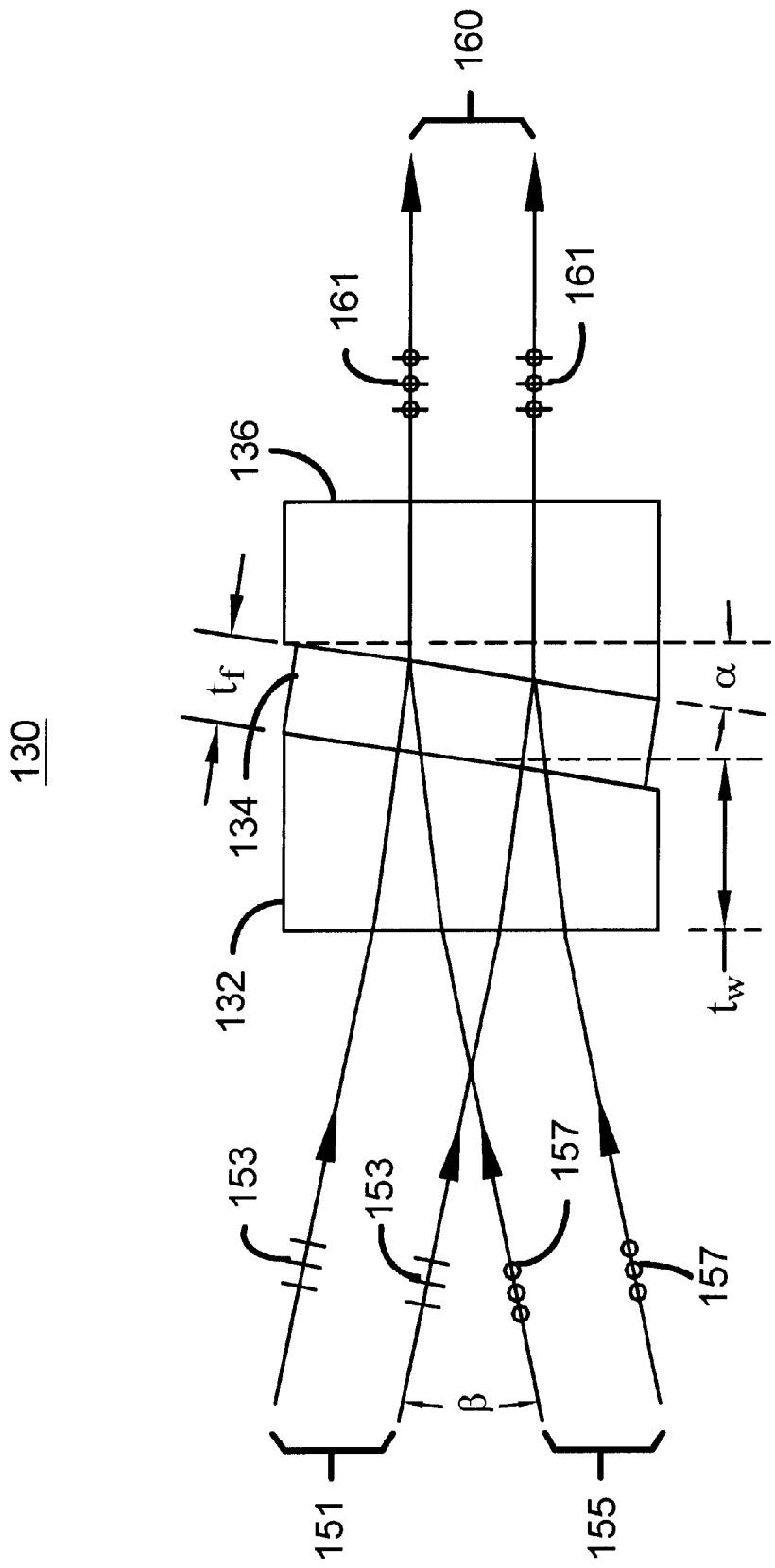
FIG. 5 is a diagram of one embodiment of a isolator/polarization beam deflector in accordance with the present invention indicating the path of light through one isolator/polarization beam deflector including the path of the optical signals.

FIG. 5 is a diagram of one embodiment of a isolator/polarization beam deflector 130 in accordance with the present invention indicating the path of light through one isolator/polarization beam deflector including the path of the optical signals. The birefringent wedges 132 and 136 each has an angle, α. Because the birefringent wedges 132 and 136 are composed of birefringent material, the index of refraction in the direction of the optical axis is $n_e$, while the index of refraction in a direction perpendicular to the optical axis is $n_o$. The optical axis of the second birefringent wedge 136 is 45 degrees from the optical axis of the first birefringent wedge 132. Furthermore, as described above, the signals 151 and 155 from the dual fiber collimator 110 have an angular separation, β. The birefringent wedges 132 and 136 each has a thickness of $t_w$ at its center. In order for the isolator/polarization beam deflector 130 to function as desired, the angular separation β follows the following relationship:

$$\beta = \sin^{-1}(n_e \sin(\sin^{-1}(n_o/n_e \sin \alpha) - \alpha)) - \sin^{-1}(n_o \sin(\sin^{-1}(n_e/n_o \sin \alpha) - \alpha))$$

In addition, the crossing distance, L, described aboved satisfies the following relationship:

$$L > (t_w/n + t_f/n_f)$$

Where n is the smaller of $n_e$ and $n_o$ and where $n_f$ is the index of refraction of the rotator 134. In addition, note that the crossing distance is set to the interface between the rotator 134 and the second birefringent wedge 136. The optical signals shown by beams 151 and 155 are combined by the isolator/polarization beam deflector 130 and exit horizontally in a beam 160, shown as in FIG. 5.

Figure 6:
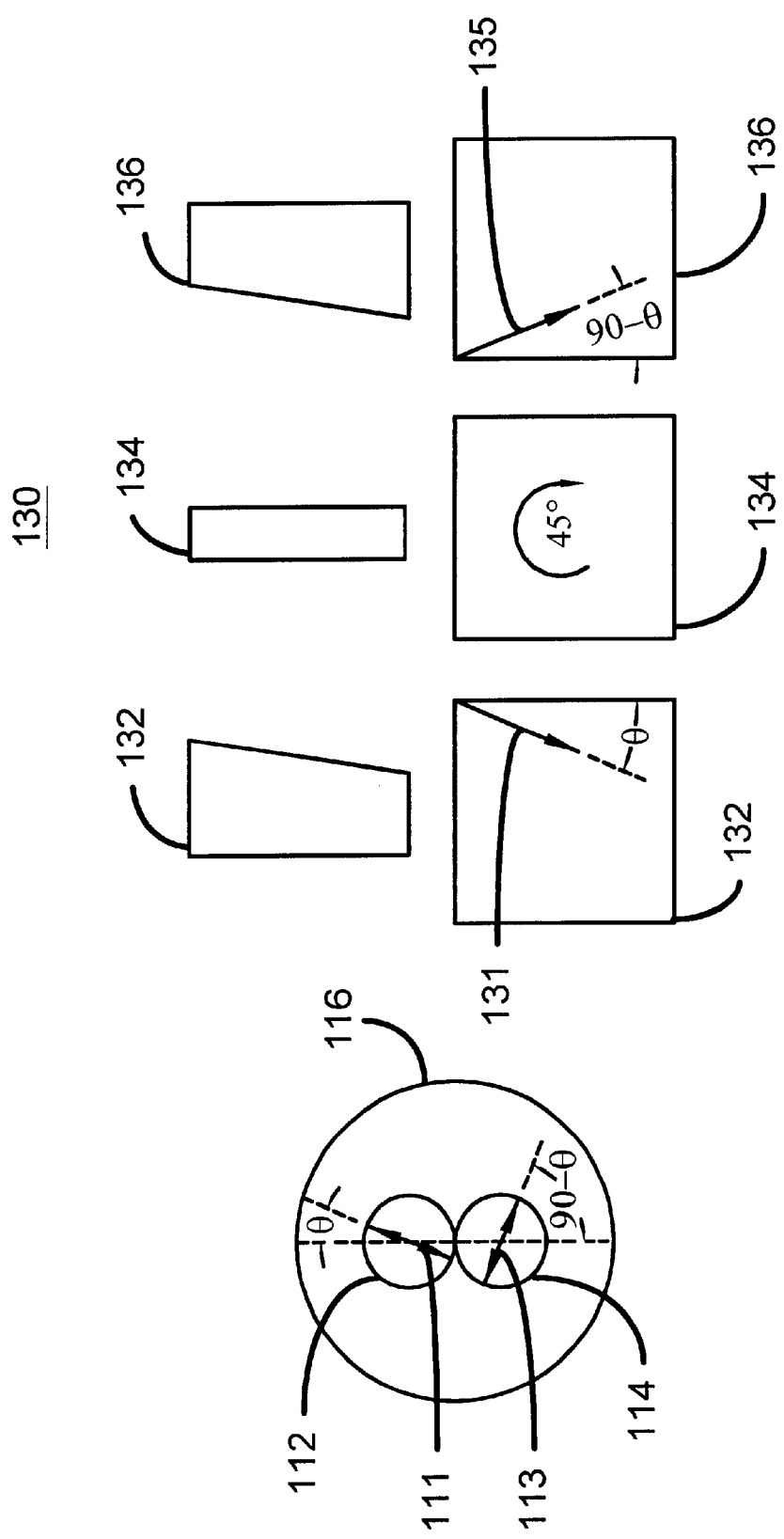
FIG. 6 is a diagram of the optical alignment of one embodiment of an isolator/polarization beam deflector in accordance with the present invention.

FIG. 6 is a diagram of the optical alignment of one embodiment of an isolator/polarization beam deflector 130 in accordance with the present invention. Also shown is the capillary 116. The optical signals in fibers 112 and 114 have polarizations 111 and 113, respectively. The polarization 111 is at an angle, θ, clockwise from vertical. The polarization in the fiber 114 is at an angle of 90°—θ counterclockwise from vertical. The optical axis 131 of the first birefringent wedge 132 is at an angle of θ clockwise from vertical, as shown in FIG. 6. The rotator 134 rotates the polarizations of the optical signals by 45 degrees clockwise. The optical axis 135 of the second birefringent wedge 136 is at an angle of 45°—θ counterclockwise from vertical. The optical axis 135 of the second birefringent wedge 136 is thus 45 degrees from the optical axis of the first birefringent wedge 132.

Figure 7A:
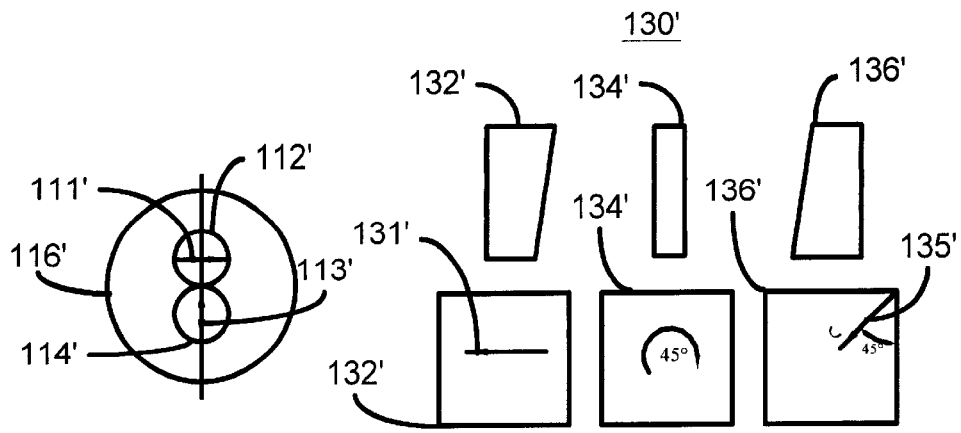
FIG. 7A is a diagram of the optical alignment one embodiment of an isolator polarization beam deflector in accordance with the present invention.

FIG. 7A is a diagram of the optical alignment one embodiment of a portion of the isolator polarization beam deflector 130' in accordance with the present invention. Thus, FIG. 7A depicts a special case of the isolator/polarization beam deflector 130 shown in FIG. 6. Referring back to FIG. 7A, also shown is the capillary 116'. The optical signals in fibers 112' and 114' have perpendicular polarizations 111' and 113', respectively. The polarization 111' is horizontal. Thus, the angle θ, discussed above, is 90° degrees. The polarization in the fiber 114' is vertical. The optical axis 131' of the first birefringent wedge 132' is horizontal. The rotator 134' rotates the polarizations of the optical signals by 45° clockwise. The optical axis 135' of the second birefringent wedge 136' is at an angle of 45° clockwise from vertical. The optical axis 135' of the second birefringent wedge 136' is thus 45° from the optical axis 131' of the first birefringent wedge 132'.

Figure 7B:
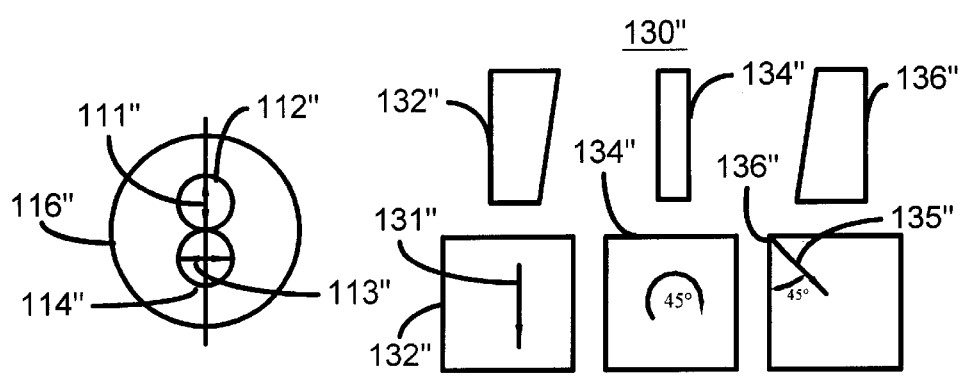
FIG. 7B is a diagram of the optical alignment of another embodiment of an isolator/polarization beam deflector in accordance with the present invention.

FIG. 7B is a diagram of the optical alignment of another embodiment of an isolator/polarization beam deflector 130" in accordance with the present invention. Thus, FIG. 7B depicts a special case of the isolator/polarization beam deflector 130 shown in FIG. 6. Referring back to FIG. 7B, also shown is the pigtail 116". The optical signals in fibers 112" and 114" have perpendicular polarizations 111" and 113", respectively. The polarization 111" is vertical. Thus, the angle θ, discussed above, is zero degrees. The polarization in the fiber 114" is vertical. The optical axis 131" of the first birefringent wedge 132" is vertical. The rotator 134" rotates the polarizations of the optical signals by 45 degrees clockwise. The optical axis 135" of the second birefringent wedge 136" is at an angle of 45 degrees counterclockwise from vertical. The optical axis 135" of the second birefringent wedge 136" is thus 45 degrees from the optical axis 131" of the first birefringent wedge 132".

Although the isolator/polarization beam deflectors 130' and 130" function well for there intended purpose, one of ordinary skill in the art will readily recognize that the birefringent wedges 132' and 136' have a different optical axis directions and are not identical. Similarly, the birefringent wedges 132" and 136" also have a different optical axis directions and are not identical.

Figure 7C:
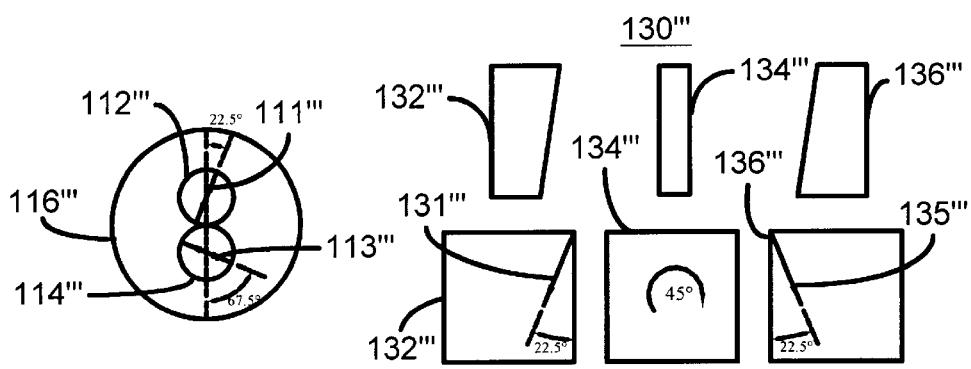
FIG. 7C is a diagram of the optical alignment of one preferred embodiment of an isolator/polarization beam deflector in accordance with the present invention.

FIG. 7C is a diagram of the optical alignment of one preferred embodiment of an isolator/polarization beam deflector 130'" in accordance with the present invention. Thus, FIG. 7C depicts a special case of the isolator/polarization beam deflector 130 shown in FIG. 6. Referring back to FIG. 7C, also shown is the capillary 116'". The optical signals in fibers 112'" and 114'" have perpendicular polarizations 111'" and 113'", respectively. The polarization 111'" is 22.5° degrees clockwise vertical. The polarization in the fiber 114" is 67.5° degrees counterclockwise from vertical. The optical axis 131'" of the first birefringent wedge 132'" is 22.5 degrees clockwise from vertical. The rotator 134'" rotates the polarizations of the optical signals by 45 degrees clockwise. The optical axis 135'" of the second birefringent wedge 136'" is at an angle of 22.5 degrees counterclockwise from vertical. The optical axis 135'" of the second birefringent wedge 136'" is thus 45 degrees from the optical axis 131'" of the first birefringent wedge 132'".

In addition, the birefringent wedges 132'" and 136'" are identical because flipping one wedge 132'" results in the other wedge 136'". As a result, the birefringent wedges 132'" and 136'" wedges can be made from the same crystal.

Figure 8A:
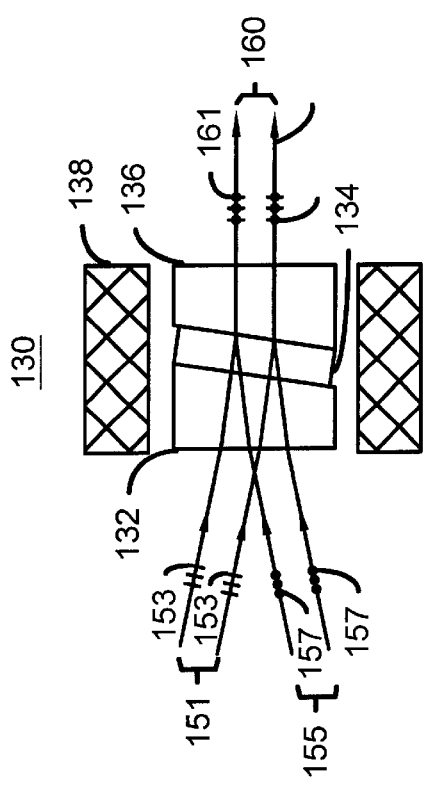
FIG. 8A is a diagram of the optical signal paths in the forward direction for one embodiment of an isolator/polarization beam deflector in accordance with the present invention.

FIG. 8A is a diagram of the optical signal paths in the forward direction for one embodiment of an isolator/polarization beam deflector 130 in accordance with the present invention. The optical signals input to the isolator/polarization beam deflector 100 have been collimated by the first collimator 110. Consequently, the collimated optical signals 151 and 155 are provided to the isolator/polarization beam deflector 130 with the desired angle of β to each other. The optical signal 151 has a polarization 153 (in the plane of the page of FIG. 8A) that is essentially vertical. The polarization 157 of the optical signal 155 is horizontal (out of the plane of the page in FIG. 8A). The optical signal 151 is the extraordinary ray and thus experiences an index of refraction of $n_e$ while passing through the first birefringent wedge 132. The polarization 151 of optical signal 151 is then rotated by 45 degrees by the rotator 134 and is thus the ordinary ray for the second birefringent wedge 136. Thus, the optical signal 151 experiences and index of refraction of $n_o$ while passing through the second birefringent wedge 136. Choosing $n_e > n_o$, the optical signal 151 is thus deflected up, by the angle β/2. Thus, the optical signal 151 exits the isolator/polarization beam deflector 130 traveling horizontally.

Similarly, the optical signal 155 is the ordinary ray and thus experiences an index of refraction of $n_o$ while passing through the first birefringent wedge 132. The polarization 157 of optical signal 155 is then rotated by 45 degrees by the rotator 134 and is thus the extraordinary ray for the second birefringent wedge 136. Thus, the optical signal 155 experiences and index of refraction of $n_e$ while passing through the second birefringent wedge 136. Again choosing $n_e > n_o$, the optical signal 155 is thus deflected down by the angle β/2. Thus, the optical signal 155 exits the isolator/polarization beam deflector 130 traveling horizontally. Moreover, because the crossing distance, L, described above satisfies the relationship $$L > t_w/n + t_r/n_f$$

The optical signals 151 and 155 from the fibers 112 and 114, respectively, can be crossed at the interface between the rotator 134 and the second birefringent wedge 136 by adjusting the relative positions of the dual fiber collimator 110 and the isolator/polarization beam deflector 130. Thus, the optical signals 151 and 155 can be combined into one beam and output via the single fiber collimator 140.

Figure 8B:
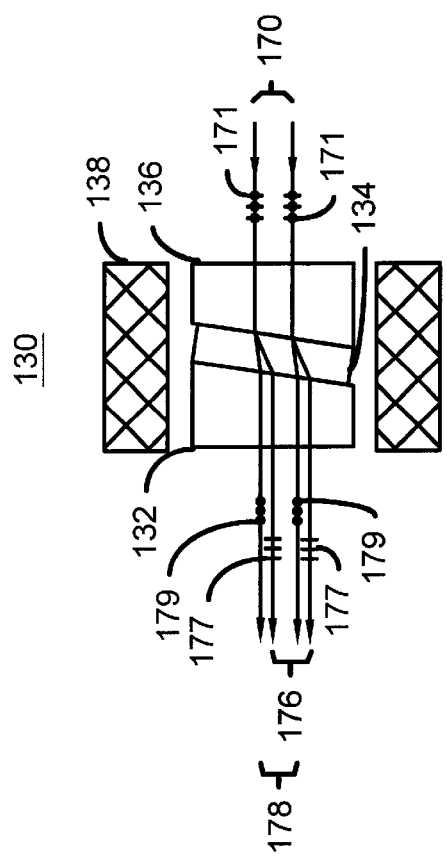
FIG. 8B is a diagram of the optical signal paths in the backward direction for one embodiment of an isolator/polarization beam deflector in accordance with the present invention.

FIG. 8B is a diagram of the optical signal paths in the backward direction for one embodiment of an isolator/polarization beam deflector 130 in accordance with the present invention. The optical signal 170 is provided to the isolator/polarization beam deflector 130 in the backward direction. The optical signal 170 is generally the reflections of the optical signal (not shown in FIG. 8B) that is provided from the isolator/polarization beam deflector to the single fiber collimator 140. The reflected signal 170 thus travels in a second direction opposite to the first (forward) direction traveled by the optical signal shown in FIG. 8A.

Referring back to FIG. 8B, the polarization 171 of the reflected optical signal 170 has both vertical and horizontal components. The reflected optical signal 171 preferably enters the isolator/polarization beam deflector traveling horizontally. The reflected optical signal 171 is split into two optical signals 176 and 178 as the reflected optical signal 171 travels through the isolator-polarization beam deflector 130. The reflected optical signal 176 has a vertical polarization 177. The reflected optical signal 178 has a horizontal polarization 179 (out of the plane of the page in FIG. 8B). In addition, the reflected optical signals 176 and 178 are walked off with respect to each other but are not deflected from their original direction. The coupling efficiency of dual fiber collimator 110 is highly angularly sensitive. Furthermore, the directions of reflected optical signal 176 and 178 are angled to the direction which provides maximized coupling efficiency to the fibers 112 and 114 via the dual-fiber collimator 110. Therefore, the reflected optical signals 176 and 178 will only couple into the fibers 112 and 114 with a high loss. Hence, optical isolation for the optical signals 176 and 178 is achieved, preventing optical signals 176 and 178 from reaching the fibers 112 and 114.

Thus, the isolator/polarization beam combiner 100 uses fewer components than a conventional component. Consequently, the insertion loss for the hybrid component 100 is lower compared with that for a conventional component. The use of fewer components and configuration of the components also simplifies assembly of the hybrid component 100. Moreover, the use of fewer optical components as well as the selection of the less expensive C-lens for the dual fiber collimator 110 and the single fiber collimator 140 lowers the cost of the isolator/polarization beam combiner 100. Consequently, better performance can be achieved at a lower cost.

A method and system has been disclosed for a low cost isolator/polarization beam combiner. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An isolator/polarization beam combiner comprising:

a first collimator for collimating a plurality of optical signals traveling in a first direction;

a core for receiving the plurality of optical signals from the first collimator, the core including a first birefringent wedge, a second birefringent wedge and a rotator between the first birefringent wedge and the second birefringent wedge, the first collimator, the first birefringent wedge and the rotator transmitting the plurality of optical signals such that the plurality of optical signals cross at an interface between the rotator and the second birefringe the wedge, the core for transmitting the plurality of optical signals with a deflection, for combining the plurality of optical signals to provide a combined optical signal and for preventing a reflected portion of the plurality of optical signals from traveling in a second direction opposite to the first direction; and a second collimator for receiving the combined optical signal and focusing the combined optical signal to be output;

wherein the first birefringent wedge has a first optical axis, a first face, a second face, and a first angle between the first face and to perpendicular to the second face and wherein the second birefringent wedge has a second optical axis oriented 45 degrees from the first optical axis and the first angle;

wherein the plurality of optical signals include a first signal and a second signal, the first signal and the second signal being separated by a second angle as the first optical signal and the second optical signal are incident upon the core wherein the first birefringent wedge and the second birefringent wedge have an ordinary index of refraction ($n_o$) and an extraordinary index of refraction ($n_e$) and wherein the first angle (α) and the second angle (β) obey the relationship:

$$\beta = \sin^{-1}(n_e \sin(\sin^{-1}(n_o/n_e \sin \alpha) - \alpha)) - \sin^{-1}(n_o \sin(\sin^{-1}(n_e/n_o \sin \alpha) - \alpha)).$$

2. The isolator/polarization beam combiner of claim 1 wherein the first collimator is a dual fiber collimator having a crossing distance, the crossing distance being greater than a thickness of the first birefringent wedge divided by the smaller of $n_o$ and $n_e$, plus a thickness of the rotator divided by a refractive index of the rotator.

3. The isolator/polarization beam combiner of claim 1 wherein the first collimator is a C-lens collimator.

4. The isolator/polarization beam combiner of claim 1 herein the second collimator is a C-lens collimator.

5. A method for allowing plurality of optical signals to be combined, the method comprising the steps of:
   (a) collimating the plurality of optical signals traveling in a first direction using a first collimator;
   (b) providing the plurality of optical signals from the first collimator to a core, the core including a first birefringent wedge, a second birefringent wedge and a rotator between the first birefringent wedge and the second birefringent wedge, the first collimator, the first birefringent wedge and the rotator transmitting the plurality of optical signals such that the plurality of optical signals cross at an interface between the rotator and the second birefringent wedge, the core for transmitting the plurality of optical signals with a deflection, for combining the plurality of optical signals to provide a combined signal and for preventing a reflected portion of the plurality of optical signals from traveling in a second direction opposite to the first direction; and
   (c) providing the combined optical signal to a second collimator; and
   (d) focusing the combined optical signal to the output fiber using the second collimator;
   wherein the first birefringent wedge has a first optical axis and a first angle and wherein the second birefringent wedge has a second optical axis oriented 45 degree from the first optical axis and the first angle;
   wherein the plurality of optical signals include a first optical signal and a second optical signal, the first optical signal and the second optical signal being separated by a second angle as the first optical signal and the second optical signal are incident upon the core;
   wherein the first birefringent wedge and the second birefringent wedge have an ordinary index of refraction ($n_o$) and an extraordinary index of refraction ($n_e$) and wherein the first angle ($\alpha$) and the second angle ($\beta$) obey the relationship:

$$\beta = \sin^{-1}(n_e \sin(\sin^{-1}(n_o/n_e \sin \alpha) - \alpha)) - \sin^{-1}(n_o \sin(\sin^{-1}(n_e/n_o \sin \alpha) - \alpha)).$$

6. The method of claim 5 wherein the first collimator has a crossing distance, the crossing distance being greater than a thickness of the first birefringent wedge divided by the smaller of $n_o$ and $n_e$, plus a thickness of the rotator divided by a refractive index of the rotator.

7. The method of claim 5 wherein the fir t collimator is a C-lens triple fiber collimator.

8. The method of claim 5 wherein the second collimator is a C-lens collimator.

* * * * *